(12) United States Patent
Pascal

(10) Patent No.: US 6,186,354 B1
(45) Date of Patent: *Feb. 13, 2001

(54) WEDGE BOX OF ALVEOLAR MATERIAL MOULD AND PROCESS FOR ITS PRODUCTION

(75) Inventor: René Claude Pascal, Soultzmatt (FR)

(73) Assignee: Knauf (FR)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 09/173,938

(22) Filed: Oct. 16, 1998

(30) Foreign Application Priority Data

Oct. 20, 1997 (FR) .................................. 97 13104

(51) Int. Cl.[7] .................................................. B65D 25/54
(52) U.S. Cl. ...................... 220/377; 220/602; 220/592.25
(58) Field of Search .................................. 220/662, 602, 220/592.2, 592.25, 377, 837, 4.21, 4.22

(56) References Cited

U.S. PATENT DOCUMENTS

| | | | |
|---|---|---|---|
| 2,172,864 | * | 9/1939 | Calva et al. .......................... 220/602 |
| 3,524,564 | * | 8/1970 | Schurman ............................. 220/662 |
| 3,667,648 | * | 6/1972 | Koziol .................................. 220/211 |
| 4,220,134 | * | 9/1980 | Snyder ................................. 126/390 |
| 4,422,560 | * | 12/1983 | Solomon ............................. 220/377 |
| 5,711,449 | * | 1/1998 | Arn ..................................... 220/293 |
| 5,860,550 | * | 1/1999 | Miller et al. ........................ 220/4.23 |
| 6,029,842 | * | 2/2000 | Sheffler et al. ..................... 220/288 |

FOREIGN PATENT DOCUMENTS

| | | | |
|---|---|---|---|
| 512985 | * | 8/1952 | (BE) ..................................... 220/662 |
| 491341 | * | 10/1955 | (IT) ..................................... 220/662 |

* cited by examiner

Primary Examiner—Stephen Castellano
(74) Attorney, Agent, or Firm—Baker & Daniels

(57) ABSTRACT

A wedge box of alveolar material having a container and a lid. The container or the lid includes a window which is transparent and which is integrated and molded in the alveolar material to permit viewing the contents of the box. The box is molded by means of a mold having two cavities which include several raised surfaces. The raised surfaces are separated by a space which permit gripping of a transparent member which is to be integrated into the box as a window. Alveolar material is introduced into the molding cavity and is then expanded.

3 Claims, 2 Drawing Sheets

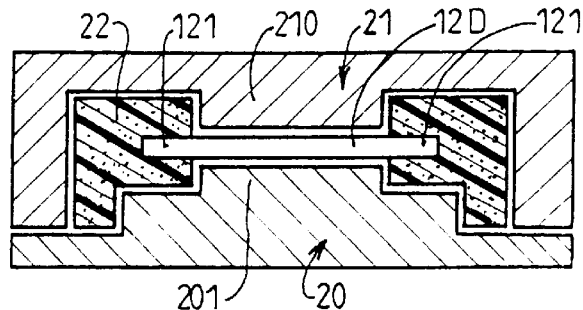
FIG. 7
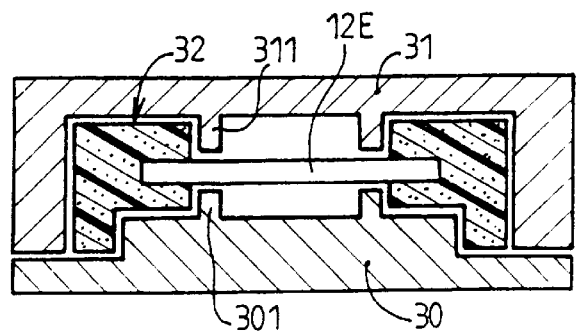
FIG. 8
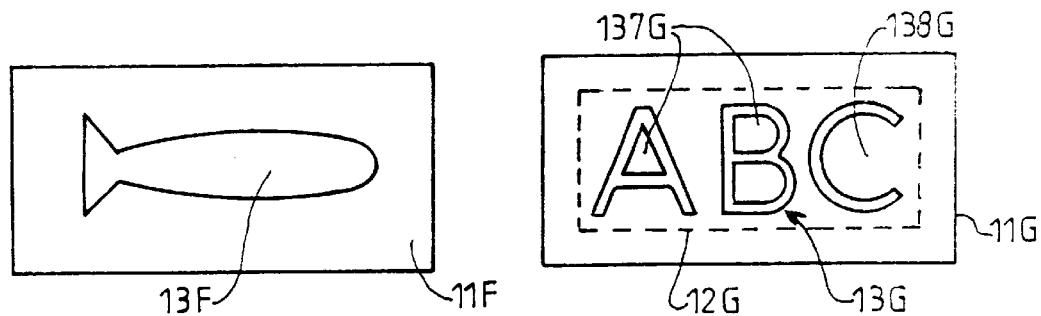
FIG. 9
FIG. 10
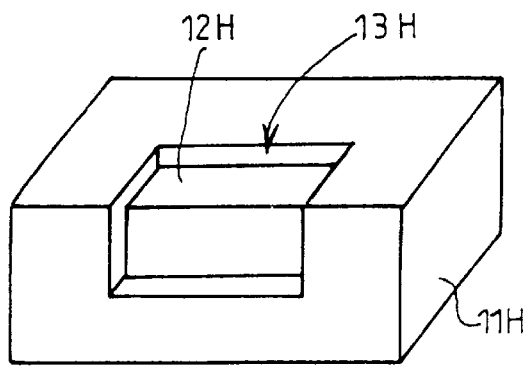
FIG. 11

WEDGE BOX OF ALVEOLAR MATERIAL MOULD AND PROCESS FOR ITS PRODUCTION

BACKGROUND OF THE INVENTION

The present invention concerns a wedge box of an alveolar material formed from at lest two elements such as a container and a lid.

The invention also concerns a mould and a process for production of such a box.

Wedge boxes of alveolar material such as expanded polystyrene (PSE) are opaque. There are also boxes (FIG. 1) formed from a container 1 holding a lid 2 of transparent material. This lid 2 is produced by injection moulding or thermomoulding. It is a thin sheet, possibly of the same type as the alveolar material. In the case of a container 1 of expanded polystyrene, the lid 2 may be made of compact polystyrene. The lid 2 has a rim in the form of a peripheral groove to house the rim 11 of container 1. But this lid 2 of very small thickness does not perform the same functions as the alveolar material of container 1. It neither protects the top of the box from impact or crushing nor provides thermal insulation. Also on a logistical level, two processing technologies and hence two suppliers are required, which involves two control and supply lines.

The lid is generally placed as show in FIG. 1. To make a box with a hinger lid such as the box in FIG. 2, the transparent lid 2' must be attached to container 1' via a hinge 3' produced in a separate operation from that of production of container 1' and lid 2'.

SUMMARY OF THE INVENTION

The purpose of the present invention is to remedy these drawbacks and propose the creation of a box, in particular a wedge box, of alveolar material which permits viewing of the contents of the box without the box being complex to produce or entailing any increase in cost for production or materials.

To this end the invention concerns a wedge box of alveolar material of the type described above, characterized in that at least one of the two elements comprises a transparent piece which is integrated into the alveolar material of the element, forming a window to allow viewing of the box contents.

In general one of the elements, i.e. the lid, comprises one or more transparent pieces forming one or more windows. These windows may have a rectangular, square, round or more generally geometric contour. The window may also have a decorative contour such as for example a row of transparent letters or figures or logos.

The transparent piece forms one part with the mass of the alveolar material; it is therefore inviolable and any attempts to open the window can only be destructive, leaving clearly visible traces.

The second element of the box is a container, i.e. an element with a certain depth in which are placed either the products to be packed or an element in the shape of a plate on which is placed or fixed the product or products to be packed.

Although in the most general case the transparent piece is a flat surface, for boxes of rectangular shape of specific content, the window which generally occupies the top of the box can also be applied to on or more sides to give a more accurate view of the box contents. This can also meet commercial and/or aesthetic requirements.

The transparent piece forming the window or windows can have partial or complete islands of the same alveolar material as the remainder of the element as a function of the shape required for the window. These islands can be parts filling certain letters such as A, O, B etc. In the case where the box must have good insulation characteristics, it is also possible for the transparent piece to be made from several thicknesses or layers separated by an air interval. These different layers are preferably attached to each other so they can be handled as one piece for positioning in the mould.

The box is preferably made of expanded polystyrene and the transparent piece of transparent compact polystyrene.

The term "transparent" used in the present description comprises the various degrees of transparency between the more or less translucid state up to perfect transparency.

The invention also concerns a mould for production of a box or box element as defined above, where the box consists of several parts and is characterized in that each of its parts has a zone of extra thickness in relation to the other surfaces of the mould forming the moulding cavity, where the zones of two parts of the mould of greater thickness are similar and correspond to the surface area required for the window, and when the mould is closed these two zones are separated by a space allowing gripping of the transparent piece to be integrated into the box element.

It may be interesting to apply relief elements (slight relief) to the zoned of extra thickness to allow traces or impressions on the transparent piece during moulding.

According to another advantageous characteristic, the mould has several similar zones of extra thickness, leaving between them spaces forming a moulding cavity to hold the alveolar material and produce several windows occupied by one or more transparent pieces common to several windows. Finally, the invention also concerns a production process for a wedge box, this process being characterized in that an expansion mould is used in which is placed and fixes a transparent piece which is intended to form the window of the box element, then the alveolar material is introduced into the cavity of the mould and expanded.

BRIEF DESCRIPTION OF THE DRAWINGS

The present invention will be described below in a more detailed manner ;using the various design examples shown diagrammatically in the attached drawings in which:

FIG. 7 is a cross section of the mould and lid produced with such a mould, FIG. 8 shows another variant of the mould and lid produced with this mould, FIGS. 9 and 10 are views from above of lids showing the various shapes of the windows, FIG. 11 shows a lid with a window extending over the top and one side.

DESCRIPTION OF THE PREFERRED EMBODIMENT

Figure 1:
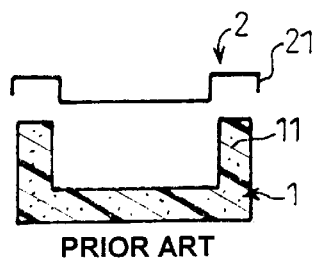
FIG. 1 is a diagrammatic cross section of a box with a transparent lid according to the state of the art.
Figure 2:
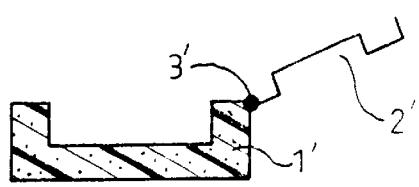
FIG. 2 is a diagrammatic cross section of a box similar to that of FIG. 1 but where the lid is produced by hinging to the container of the box.
Figure 3:
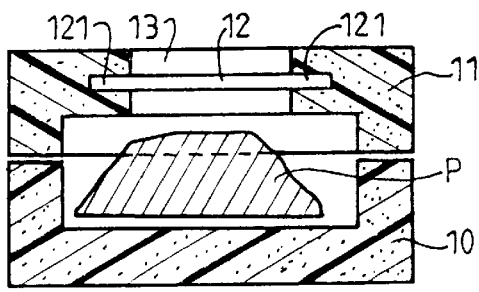
FIG. 3 is the diagram of a box according to the invention

According to FIG. 3 the invention concerns a wedge box of alveolar material. This box is formed for example by two elements 10, 11; one element (10) constitutes the container containing product P and the other element (11) the lid. The element 11 has a transparent piece 12 integrated into the alveolar material of the element 11 by its rim 121 and thus forming a window 13. This window shows the contents P of box 10, 11.

Figure 4:
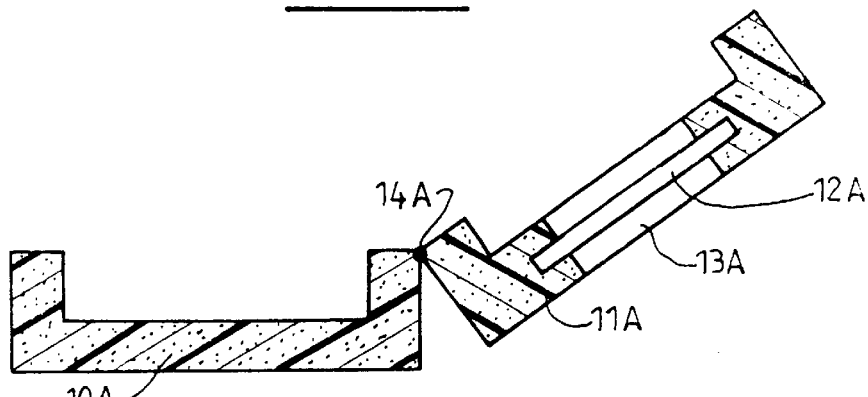
FIG. 4 is a diagrammatic cross section of a box with a hinged lid according to the invention.

FIG. 4 shows another design of the box according to the invention. Element 10A forms a container and element 11A a lid, these two elements being connected by hinge 14A. The element 11A is fitted with a transparent piece 12A integrated into the window 13A.

Figure 5:
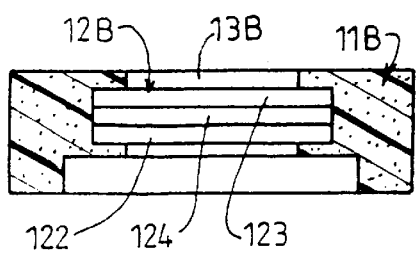
FIG. 5 is a cross section of a box lid with an insulating window.

The method of production of FIG. 5 concerns a feature of lid 11B, of which the window 13B is occupied by a transparent element 12B formed by two layers of transparent material 122, 123 separated by an air or vacuum gap 124. The assembly formed by the transparent layers 122, 123 separated by the air gap 124 constitutes an integrated whole as in the alveolar material of element 11B.

Figure 6:
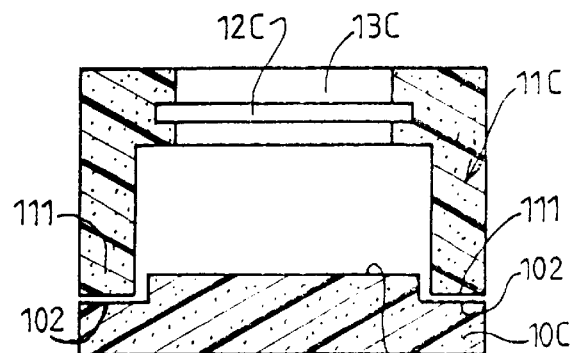
FIG. 6 is a cross section of a box in which the element holding the lid is a plate.

FIG. 6 shows a variant in which the first element 10C is in the form of a plate with a raised zone 101 to produce a peripheral rebate 102 in which is housed the lower rim 111 of the second element 11C which also has a window 13C occupied by a transparent piece 12C integrated by its rim into the alveolar material of element 11C.

The various elements constituting the wedge box of alveolar material are preferably made of expanded polystyrene (PSE) and the transparent piece 12, 12A, 121, 122, (12B), 12C is preferably a sheet of compact "crystal" polystyrene, i.e. transparent polystyrene.

FIG. 7 shows in cross section a first mould in two parts 20, 21 of complementary form, defining between them a moulding cavity 22. The two parts 20, 21 of the mould each have a thicker zone 201, 210 separated by a space when the mould is closed, where this space corresponds approximately to the thickness of the transparent part 12D intended to be integrated in the alveolar material element to be produced.

Firstly, the transparent piece 12D is placed in the mould (for example on the raised zone 201) by positioning this piece 12D precisely and holding it in place for example by vacuum, a suction device or a similar means. The mould is then closed by positioning the second part 21 of the mould to obtain the moulding cavity 22 into which is introduced the alveolar material to be expanded. This material fills the cavity 22 and thus surrounds the rim 121 of the transparent piece 12D.

After expansion the object is removed from the mould, rendering an element with a window as shown in FIGS. 3, 4 or 5 (in the latter case the transparent piece 12D is replaced by a piece with two or more layers 122, 123).

FIG. 8 shows another mould comprising two parts 30, 31 with a rim 301, 311 surrounding the part forming the window. These rims 301, 311 serve to hold the transparent piece 12E during moulding of the element.

Once the transparent piece 12E is fitted in the mould, the expanded material is introduced in the cavity 13, expanded, and then removed from the mould.

FIGS. 9 and 10 show non-geometric or polygonal window forms. FIG. 9 shows the window in the form of a fish 13F, for example in a lid for a wedge box containing fish.

In the case of element 110 of FIG. 10, the window 13G is constituted by three letters A, B, C. These windows are complete islands of alveolar material 137G such as in the letter A or partial islands 138G as for the inside of the letter C. These islands of material 137G or 138G are in fact constituted by alveolar material which covers the corresponding zone of the transparent piece 12G. This transparent piece 12G may be rectangular in shape as indicated by a dotted line and occupying the entire area corresponding to letters A, B, C.

FIG. 11 shows an element 11H with a window 13H occupying the top and one side of element 11H. In this case the transparent piece 12H has a form which matches the form of the window, i.e. the form of a right-angled dihedral.

Other curved or three-dimensional forms are also possible.

To summarize, in all cases the element with the window retains the greatest part of its function of impact resistance, support and insulation while giving sight of the box contents.

What is claimed is:

1. A wedge box of alveolar material comprising:
   a first element made of alveolar material; and
   a unitary element operatively associated with said first element,
   said unitary element including:
      a second element made of alveolar material; and
      a transparent window integrally molded into said second element,
   whereby a rim portion of said transparent window is integrated into and forms an inviolable part of the mass of the alveolar material of said second element.

2. The box of claim 1 wherein said unitary element is a lid.

3. A wedge box of alveolar material comprising:
   a first element made of alveolar material, and
   a unitary element operatively associated with said first element,
   said unitary element including:
      a second element made of alveolar material; and
      a transparent window integrally molded into said second element,
   whereby a rim portion of said transparent window is integrated into and forms an inviolable part of the mass of the alveolar material of said second element.
   wherein the first and second elements are made from expanded polystyrene and the transparent window is made from compact crystal polystyrene.

* * * * *